United States Patent [19] [11] 3,752,919
Qurashi et al. [45] Aug. 14, 1973

[54] WEATHER TIME DISPLAY

[75] Inventors: Maqbool Qurashi, Pennsauken, N.J.; Lincoln W. Faries, Richboro, Pa.

[73] Assignee: Jerrold Electronic Corporation, Hatboro, Pa.

[22] Filed: Aug. 19, 1971

[21] Appl. No.: 172,987

[52] U.S. Cl...... 178/7.88, 178/DIG. 1, 178/DIG. 38, 178/DIG. 6
[51] Int. Cl........................... H04n 5/22, H04n 7/18
[58] Field of Search............ 178/7.88, 7.89, DIG. 1, 178/DIG. 38

[56] References Cited

UNITED STATES PATENTS

| | | | |
|---|---|---|---|
| 3,477,782 | 11/1969 | Sherwin | 178/7.89 UX |
| 3,134,297 | 5/1964 | Carlson et al. | 178/7.88 |
| 2,566,509 | 9/1951 | Albright | 178/DIG. 1 |
| 2,671,131 | 3/1954 | Johnson | 178/DIG. 1 |
| 3,626,094 | 12/1971 | Widdekind et al. | 178/DIG. 1 |

FOREIGN PATENTS OR APPLICATIONS

| | | | |
|---|---|---|---|
| 899,234 | 6/1962 | Great Britain | 178/DIG. 38 |

*Primary Examiner*—Howard W. Britton
*Attorney*—Sandoe, Hopgood & Calimafde

[57] ABSTRACT

A weather-time display, such as for use in a closed-circuit of cable television system, includes a plurality of sensors for producing signals proportional to a corresponding plurality of selected environmental parameters. Those signals are sequentially applied to a meter to which a rotatable mirror is coupled. An image of an indicator is projected onto that mirror and from there it is reflected onto an image plane located at the viewing plane of a video camera. Images of scales calibrated in units appropriate to the sensed parameters are sequentially superimposed with the image of the indicator at the image plane such that sequential composite images of the scales and the indicator are formed for viewing and transmission by the video camera. If desired, and as herein shown, an image of the time may also be superimposed on the composite scale-indicator image at the image plane.

17 Claims, 8 Drawing Figures

INVENTORS
MAQBOOL A. QURASHI
LINCOLN FARIES
BY
Sandoe, Hopgood & Calimafde
ATTORNEYS INVENTORS
MAQBOOL A. QURASHI
LINCOLN FARIES
BY
Sandoe, Hopgood & Calimafde
ATTORNEYS INVENTORS
MAQBOOL A. QURASHI
LINCOLN FARIES
BY
Sandoe, Hopgood & Calimafde
ATTORNEYS

WEATHER TIME DISPLAY

The present invention relates generally to information display systems, and more particularly to a composite, multiple image display and transmission system in which a display of information of several parameters is sequentially produced for scanning by a television camera or the like.

In closed-circuit or cable television systems, one channel is commonly set aside to provide constantly updated weather data such that the viewer, simply by selecting the appropriate channel, has presented to him a display of one or more pertinent weather data, such as temperature, air pressure, wind velocity and the like.

Systems of this type generally include a plurality of meters each of which has a separate readout or scale on which the measured parameter is displayed in appropriate units. These scales are viewed by a television camera which is swept either manually or automatically over the faces of each of the meters in a predetermined sequence, such that the viewer is presented with a sequential presentation of the information displayed on the meters. Alternately, a mirror may be interposed between the faces of the meters, that mirror being movable to permit the image of each meter scale to be sequentially presented to the television camera.

The disadvantages of these known systems for providing visual information relating to several parameters to viewers on a closed television circuit or cable television circuit are apparent and have long been recognized. These disadvantages include the required use of a plurality of meters, one for each parameter to be displayed, and the necessity that each meter have a relatively larger dial (8 inch dials being typically employed) to permit the video camera to transmit an easily readable image of the meter dial. Also required in these known systems is a complex and bulky mechanism for either moving the video camera so that it sequentially scans each of the meter dials, or a similarly complex mechanism for rotating the mirror or mirrors to sequentially reflect the dials of the several meters to the video camera.

The presently employed image display systems are thus of necessity relatively bulky and complex, and thus liable to periodic operating difficulties, and are moreover expensive, particularly as a result of the required plurality of large-sized meters and the complex scanning mechanism.

It is an object of the present invention to provide a multiple-image display system which is less costly and more reliable than the presently known systems of this type.

It is another object of the invention to provide a multi-image display system of the type described that requires only a single meter.

It is a further object of the invention to provide a system of the type described in which the number of moving components is significantly reduced as compared to the presently known systems of this type.

It is yet another object of the invention to provide a multi-image display device of the type described which is more compact, more reliable, and less costly than otherwise comparable devices having a multi-image display capability.

The multi-image display device of the invention includes only a single meter the input of which sequentially receives the outputs of a plurality of data sensors. As herein described, those sensors produce signals that represent the magnitude or direction of a specified meteorological parameter, although other types of data signals may be similarly presented to the meter for display by the system.

Also included in the system of the invention are a plurality of simulated meter dial faces or scales calibrated in the appropriate units for the parameters which are to be displayed. The scales are sequentially illuminated so that images of the scales are sequentially reflected onto the image plane of a video camera. Superimposed on that image plane is an image of an indicator (arrow) which is caused to move over the image of the scale then formed on the image plane, in response to the parameter signal applied to the meter.

To that end, the movable element of the meter is coupled to a mirror which in turn receives the indicator image such that the rotation of that mirror causes the image of the indicator to move transversely across a parabolic reflector, from which the indicator image is reflected onto the image plane of the video camera and is there superimposed with the image of the then illuminated calibrated scale. The resulting composite image presented to the video camera is thus a simulated meter scale and movable indicator presenting an accurate reading in clearly viewable units of the parameter then being monitored.

That composite image is picked up by the video camera and transmitted over suitable cables to the television receivers coupled to those cables and tuned to the appropriate channel. The sensor inputs to the meter are sequentially changed and the various calibrated scales are sequentially illuminated in synchronism with the input switching to the meter so that the image of the scale calibrated with the appropriate units is presented to the video camera along with the arrow positioned along the scale image according to the sensed characteristic of the corresponding parameter. As a result, the display is sequentially modified to provide the viewer with information of several significant parameters in sequence, with each display providing the most recent value of the displayed parameter.

The system of the invention also includes a digital clock and an optical system for forming and superimposing an image of that clock on the video camera image plane along with the superimposed image of the parameter meter scale and indicator, to thereby provide a time indication to the viewer along with the weather information. The digital clock, as herein described, includes a continuous film separated into viewing areas on which visual indicia of time is formed representing equal increments (e.g., minutes) of a 24-hour day. The film is incrementally moved (e.g., once each minute) to advance the correct time-bearing area of the film over a projection slot from which the time indicia is projected onto the video camera image plane where it is combined with the meter scale and indicator image to form a composite time-weather information display for transmission to the system's subscribers.

In contrast to the sequentially presented weather information display, the time information is continuously present at the image plane although it is changed each time unit (e.g., minute) to represent the correct time. If desired, and as herein described, the meter scale images may be periodically replaced by an image of a message slide such as one containing an advertisement, public notice, news item, or the like, so as to increase the versatility of the system for use in a commercial television system.

To the accomplishment of the above and to such further objects as may hereinafter appear, the present invention relates to a multi-image video display system substantially as defined in the appended claims and as described in the following specification taken together with the accompanying drawings in which:

Figures 1, 2:
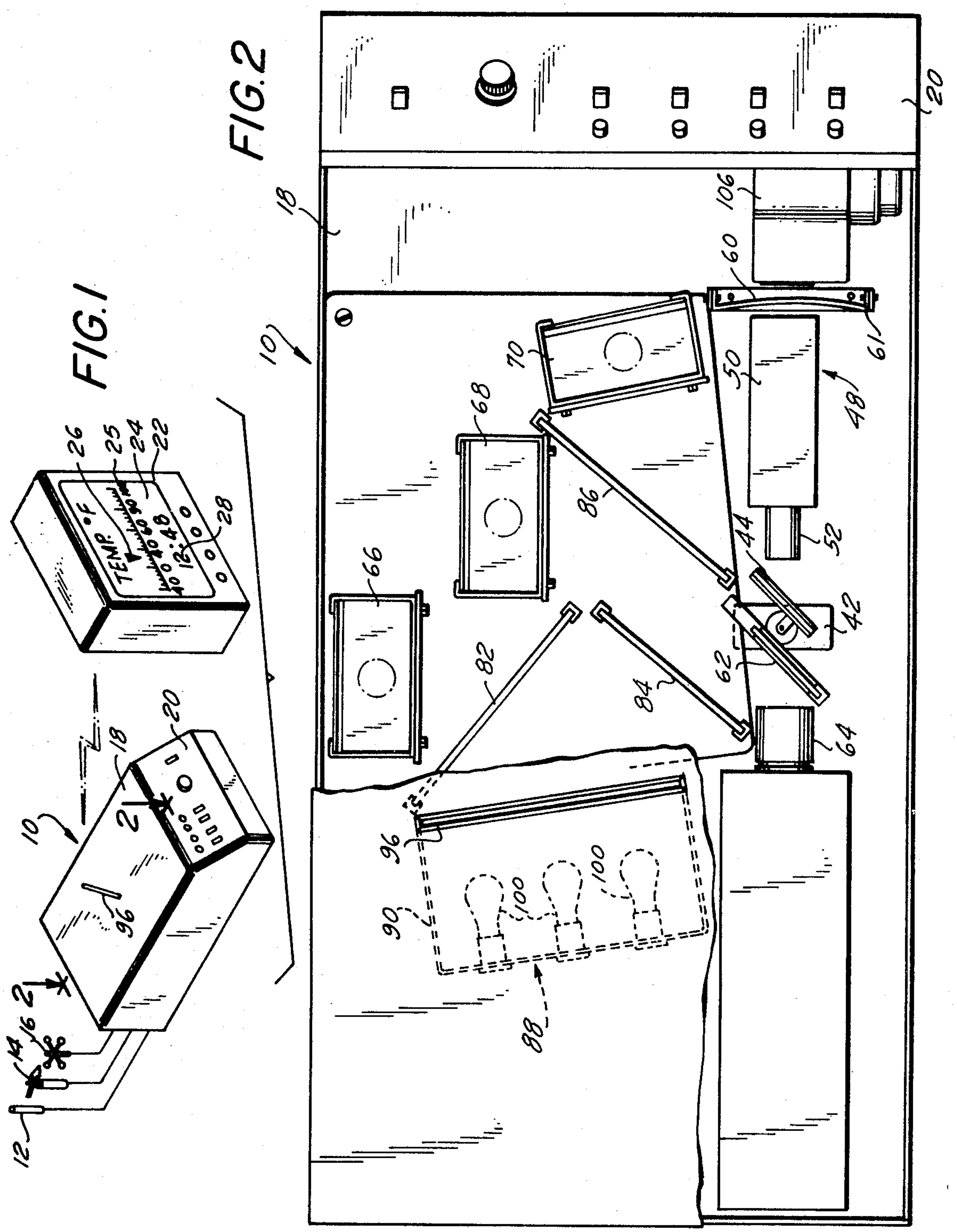
FIG. 1 is a perspective view somewhat schematic in form of the multi-image display video system of the invention illustrating a typical display produced by the system as viewed at a television receiver coupled to the system.
FIG. 2 is a plan view of the display system of FIG. 1 with the cover partly broken away, as viewed in the direction of the arrows 2—2 of FIG. 1.

Referring to the embodiment of the invention illustrated in the drawings, the multi-image display system of the invention, generally designated 10 in FIG. 1, receives inputs from a plurality of (here three) meteorological sensors or transducers 12, 14 and 16 which are here shown as sensing temperature, wind direction, and wind velocity, respectively. As more completely described below, those signals are sequentially processed to position an indicator or arrow, the image of which is sequentially superimposed onto the images of a plurality of different meter scales which are respectively calibrated in units corresponding to the sensed meteorological parameters that are to be displayed.

System 10 includes a housing 18 having a front control panel 20 in which the optical, mechanical and electrical components of the system including a video camera are contained and mounted. The sequentially superimposed images of the arrow and the calibrated meter scales are presented to the video camera which scans the composite image and transmits by any known means, including a closed video circuit or cable, a corresponding video signal to a remote television receiver 22 at which the composite display image is reproduced. In addition, and as also more fully described below, an image of the correct time is superimposed onto the same image plane, so that what is transmitted to and received at television receiver 22 is a composite picture 24 showing a calibrated meter scale 25, an indicator or arrow 26 which is movable transversely along scale 25 in accordince with the magnitude of the parameter then being displayed, and a time indication 28 which is updated each minute.

The scale 25 reproduced at receiver 22 is sequentially changed as is the relative position of the arrow with respect to the scale, to thereby permit the alternating display of the three weather paramèters being monitored by sensors 12–16. The viewer tuned to the appropriate channel to receive the transmitted weather-time display thus has before him a continuously corrected and easily readable indication of the time, and of several significant weather parameters.

Figures 3, 4, 5, 6:
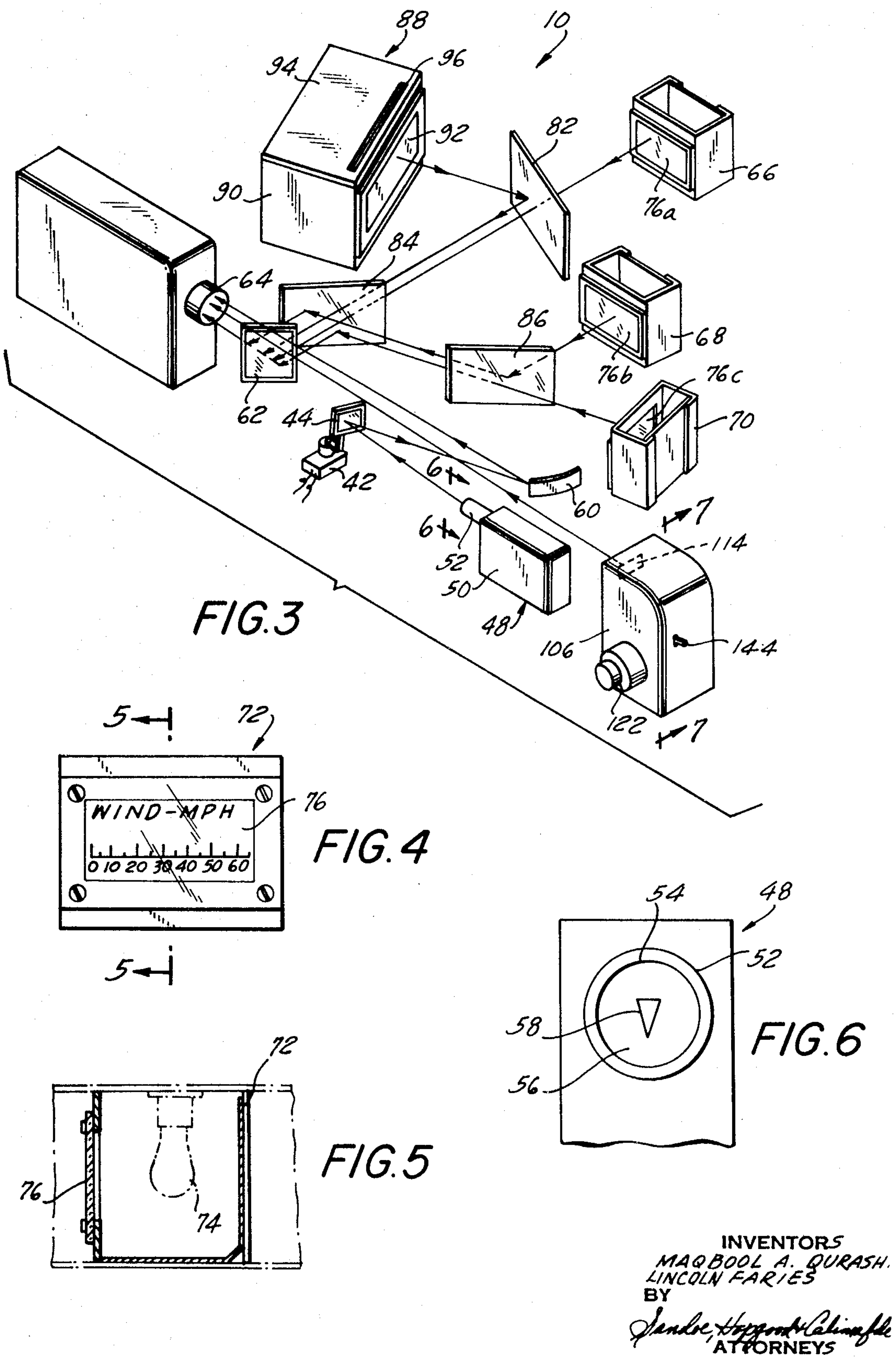
FIG. 3 is a schematic optical diagram of the multi-image display of the invention.
FIG. 4 is a front elevational view of one of the simulated meter scales of the system.
FIG. 5 is a vertical cross-section taken across the lines 5—5 of FIG. 4.
FIG. 6 is a view of the indicator projector as viewed in the direction of the arrows 6—6 of FIG. 3.

The manner in which the images of the scales are sequentially projected onto the video camera and in which the inputs from sensors 12–16 are respectively switched so as to correctly position the indicator arrow over the displayed scale is shown schematically in FIGS. 2–8. As shown in FIG. 3, the inputs of sensors 12–16 are respectively applied to the inputs of buffer amplifiers and weighting circuits 30, 32 and 34, the outputs of which are applied respectively to three fixed contacts **38*a*, 38*b* and 38*c* of a stepping switch 38, a fourth fixed contact 38*d* of switch 38 being connected to ground. A movable contact 40 is movable betwen contacts 38*a–d* and is connected to the movable coil element of a galvanometer 42 (see also FIG. 3) to which is coupled a mirror 44.**

Contact 40 is mechanically coupled to a stepping motor 46 which causes contact 40 to move incrementally so as to sequentially make contact with contacts **38*a–d* and thereby connect galvanometer 42 to the amplified and weighted signals produced by sensors 12–16, and ground respectively. As a result, the relative angular position of mirror 44, which is proportional to the signal thus applied to galvanometer 42, is proportional to the magnitude of the parameters detected by sensors 12–16.**

Enclosed in housing 18 is an arrow generator 48 (FIGS. 2 and 3) which is in the form of a lamp L1 (FIG. 8) enclosed in a lamp housing 50. Projecting from housing 50 is a lens mount 52 containing a lens 54 (FIG. 6) over which a mask 56 is placed. Mask 56 includes an opaque portion 58 here show in the form of an arrow-head.

As shown in FIG. 3, arrow generator 48 projects the image of the arrow onto the reflecting surface of galvanometer mirror 44, which in turn reflects the arrow image onto a canted parabolic mirror 60, supported on a bracket 61. Mirror 60 in turn reflects the image of the arrow through the non-reflecting surface of a mirror 62 to an image plane at the input lens of a video camera 64. The relative transverse position of the thus twice-reflected image of the arrow at the video camera image plane is proportional to the relative angular or rotational position of mirror 44, and thus to the magnitude of the signal that is applied at that time to galvanometer 42 from one of the sensors 12–16 in the manner described above.

A plurality of scale projection stages 66, 68 and 70, a typical one of which is shown in detail in FIGS. 5 and 6, is secured to housing 18 as shown best in FIG. 2. Each of stages 66–70 includes a rectangular enclosure 72 containing a lamp 74. One wall of enclosure 72 is in the form of a transparent translucent panel 76 on which a scale 77 is printed such as by a silk screen process. As can be seen in FIG. 5, scale 77 on one of panels 76 is calibrated in units of wind velocity, that is, miles per hour (mph.). The construction of the other two illuminating stages is substantially identical to that just described except that the scales printed on the translucent panels of the other stages are calibrated in units appropriate for the parameter, that is, in degrees for the temperature scale, and direction, NW, NNW, N etc., for the wind direction scale.

Referring again to FIG. 8, lamps 74 contained in the illumination stages 66–70 are represented by lamps L2, L3 and L4. Lamps L2–L4 are respectively coupled to contacts 78*a*–78*c* of a stepping switch 78 which includes a movable contact 79 mechanically coupled to stepping motor 46, and electrically connected to a 60-cycle a.c. source 80. Switch 78 is thus synchronized with switch 38 and is effective to sequentially actuate lamps L2, L3 and L4 in synchronism with the sequential connection of the outputs of sensors 12–16 to galvanometer 42. Assuming, as shown schematically in FIG. 1, that sensors 12–16 are responsive to temperature, wind direction and wind velocity, respectively, lamps L2, L3 and L4 are respectively contained in scale projecting stages 66–70 which include a scale calibrated in units representative of those parameters.

When any of lamps L2, L3 or L4 is illuminated by being connected to source 80 by switch 78, the image of the scale on the stage containing the thus illuminated lamp is projected by means of a series of beam-splitting mirrors as described below to the image plane of video camera 64, and is there superimposed with the image of the indication arrow.

To this end, when, for example, the lamp in stage 66 is illuminated, the image scale 77*a* included in that stage is passed through the transmissive surface of beam-splitting mirrors 82 and 84 and onto the reflecting surface of mirror 62 from which it is in turn reflected to the image plane of video camera 64. Similarly, the illumination of the lamp in stage 68 projects the image of its scale 77*b* onto the reflecting surface of a beam splitting mirror 86 from which it is reflected to the reflecting surface of mirror 84. From the latter the image of scale 77*b* is reflected off mirror 62 and onto the image plane of video camera 64. Similarly, the illumination of the lamp in stage 70 projects the image of the third calibrated scale 77*c* through the non-reflecting surface of mirror 86 and onto the reflecting surface of mirror 84 from which it is in turn reflected onto the reflecting surface of mirror 62 and from there onto the video camera image plane.

Thus, the illumination of any of lamps L2–L4 in stages 66–70 causes the image of one of the suitably calibrated scales 77*a*–77*c* to be presented to the video camera where it is superimposed with the image of the arrow, the latter being positioned over the scale image at a position accurately corresponding to the magnitude of the sensed parameter indicated by the scale indicia directly beneath the image of the arrow. The provision of amplifier and weighting circuits 30–34, as described above, ensures that the arrow image is transversely moved across the scales for the maximum anticipated values of each of the parameters monitored by the sensors. Thus, as desired, a composite image of a calibrated scale and movable indicator simulating an actual meter is presented to the video camera for scanning and transmission to a plurality of remote receivers.

Figure 8:
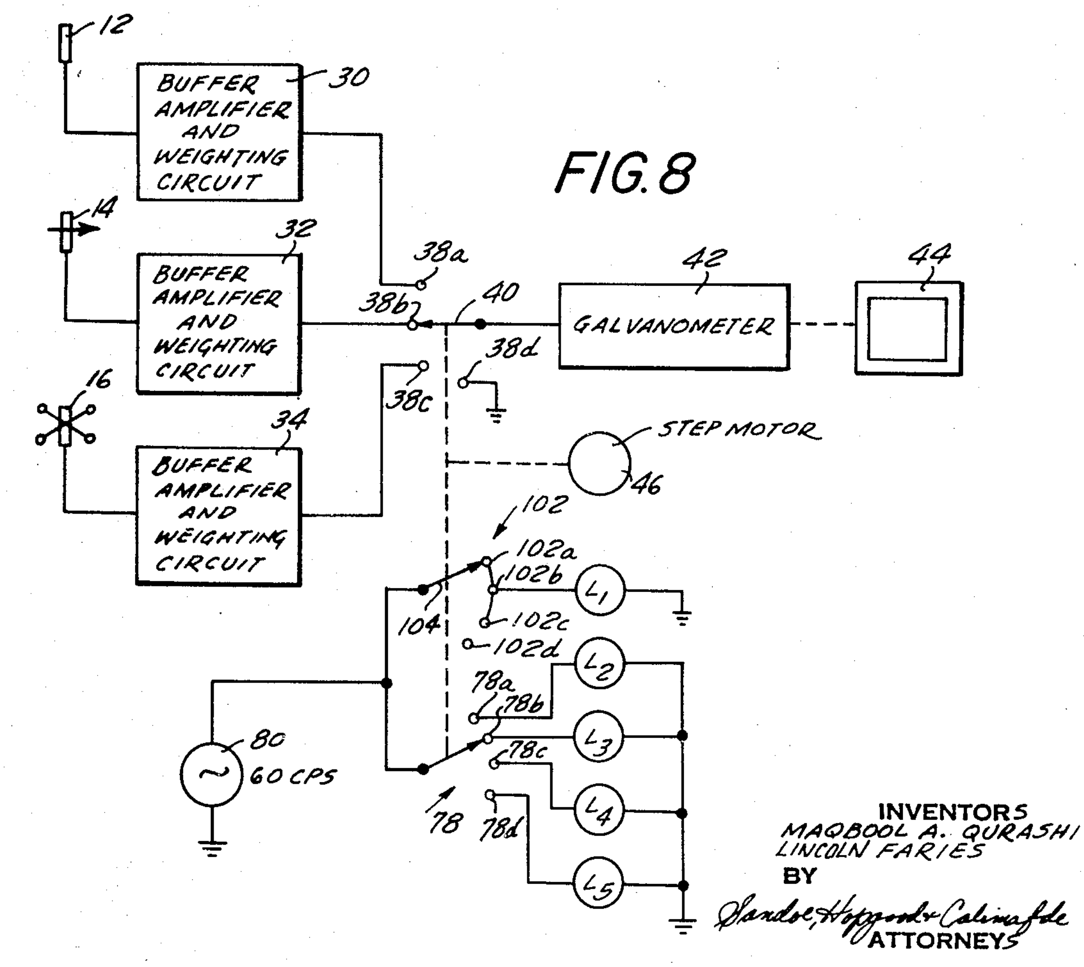
FIG. 8 is an electrical schematic diagram of the sensor and lamp sequential switching circuitry of the system.

In many applications it may be desirable to alternate commercials or other messages with the weather information. When this is desired, an additional message illumination stage 88 is included in system 10, and switch 78 is provided with an additional contact 78*d*. Stage 88 includes an enclosure 90 having a front transparent panel 92 and a cover 94 in which a slot 96 is formed. As shown in FIG. 1, housing 18 also has a slot formed in its cover which is in registration with slot 96 in message stage 88. A series of series-connected lamps 100 represented as lamp L5 in FIG. 8 are contained within enclosure 90. When a printed message is inserted into slots 18 and 96 and lamps 100 (L5) are illuminated when the movable contact 79 of switch 78 is moved to engage contact 78*d*, an image of the message is projected through panel 96, onto the reflecting surface of mirror 82, onto and through the non-reflecting surface of mirror 84, and onto the reflecting surface of mirror 62 from which it is reflected onto the image plane of the video camera. At this time, lamp L1 in arrow generator 48 is turned off by the operation of a step switch 102 having a movable contact 104 connected to a.c. source 80 and a plurality of fixed contacts 102*a*, *b*, *c*, and *d*. Contacts 102*a*–*c* are all connected to lamp L1 and contact 102*d* defines an open circuit. Switch 102 is also operated by step motor 46 and is thus synchronized with switches 38 and 78 to cause lamp L1 to be illuminated whenever any one of lamps L2, L3, or L4 is illuminated to ensure that an image of an arrow is formed on the image plane whenever an image of one of the calibrated scales is presented to the video camera, and turns off lamp L1 whenever lamp L5 is illuminated and the message image is projected onto the video camera image plane.

As shown in FIG. 1, the display produced by system 10 also includes a time indication show below the weather scale (or written message). To this end, an image of the correct time is superimposed with the images of the arrow and scales. The source of the time indication is a clock generator 106 shown in greater detail in FIG. 7, which projects an image of the time, as expressed in digital form, through the non-reflecting surface of mirror 62 and onto the image plane of the video camera.

Figure 7:
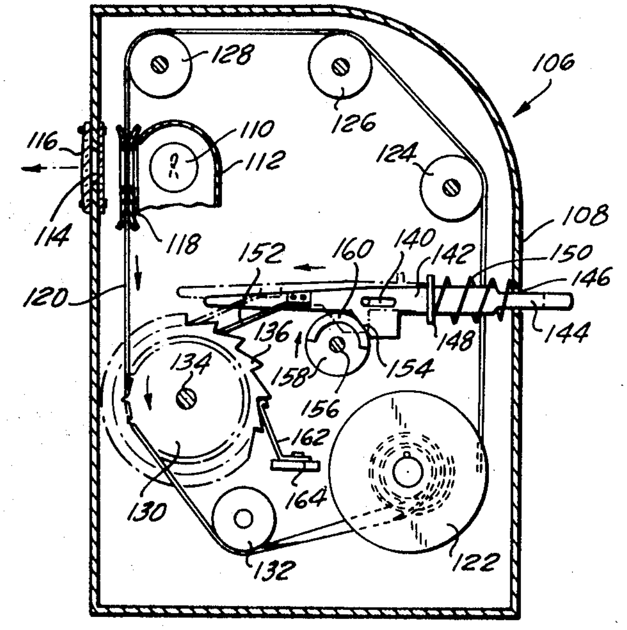
FIG. 7 is a vertical cross-section taken along the lines 7—7 of FIG. 3 of the time image projector of the system.

As shown in FIG. 7, clock generator 106 includes a housing 108 containing a lamp 110 and a reflector 112. A window 114 covered by a lens 116 is formed in the front wall of housing 108 in alignment with lamp 110. Arranged intermediate window 114 and lamp 110 is a film gate 118 through which a continuous film 120 passes.

Film 120 is a single endless piece of film containing thereon a plurality of viewing areas on which the times of a 24-hour day expressed in consecutive units of time such as minutes are reproduced. That is, film 120 contains a continuous record of a 24-hour day expressed on a minute-by-minute basis. The individual viewing areas containing the time indication, are incrementally moved past the viewing window 114 once each minute. The time indication on the viewing area at window 114 is projected by lamp 110 through window 114 and lens 116, through the non-reflecting surface of mirror 62, and onto the video screen image plane where that projected image is merged with the image of the arrow and calibrated scales to form the composite image shown in FIG. 1.

Film 120, which is preferably a 35 mm film approximately 25 feet in length, is wound about a continuous film take-up spool 122 and passes over rollers 124, 126 and 128, sprocket wheel 130 and roller 132. Rollers 124–128 and 132 serve to maintain film 120 in proper tension, and sprocket wheel 130 engages sprocket holes arranged axially along one edge of film 120. Sprocket wheel 130 is fast on a shaft 134 which in turn is secured to a ratchet wheel 136.

Also mounted in housing 108 is a pin 138 which passes through a lateral slot 140 formed in an actuating arm 142 which in turn has a reduced width end 144 extending through an opening 146 formed in the rear wall of housing 108. A plate 148 is secured to arm 142 inboard the rear housing wall and a spring 150 is arranged between plate 148 and the rear housing wall. A pawl or finger 152 is attached to the forward end of arm 142 and is urged into engagement with one of the peripheral teeth of ratchet wheel 136.

Arm 142 also includes a downwardly sloping camming surface 154. A shaft 156 coupled to a 60 cps synchronous motor (not shown) carries a disc 158, the latter in turn including a semicircular circumferential camming member 160 projecting therefrom. Disc 158 along with camming member 160 make one complete rotation each minute. During each engagement of surface 154 of arm 142 and member 160, arm 142 is urged laterally to the right as viewed in FIG. 7 to the solid-line position of the arm shown in that figure, to compress spring 150 between plate 148 at the rear housing wall. As soon as the arcuate camming member 160 passes by the camming surface, spring 150 urges arm 142 and pawl 152 carried thereby to the left as viewed in FIG. 7 to the broken line position.

The resulting lateral movement of pawl 152 acts upon the ratchet wheel 136 to cause the latter to incrementally rotate in a counterclockwise direction, to in turn cause the film sprocket wheel 130 to make a corresponding incremental rotational movement, and incrementally move film 120 downwardly so that the succeeding viewing area of the film containing the immediately succeeding time indication is presented at window 114 and projected onto the video camera image plane. As disc 158 continues to rotate member 160 again comes to bear against camming surface 154 causing arm 142 to once again move to the right. Sprocket wheel 136 and thus film 120 are not affected by this movement, until camming member 158 passes by surface 154 at which time the arm is again urged leftward producing an additional incremental movement of ratchet wheel 135 and of film 120 past window 114. An anti-backlash device including a resilient finger 162 mounted on a base 164 prevents clockwise rotation of the sprocket wheel following each operation of pawl 152 thereon so that the viewing area of film 120 is maintained precisely in registration with window 114, until film 120 is moved incremetally to its next position. The clock image thus produced at the video camera image plane is thus a constant, easily read digital time indication which persists for a period of about 59 seconds and changes rapidly in the next second to a time indication at the next highest minute.

The display device of the invention thus has the capability of presenting for viewing by a remote television camera a composite image of a calibrated scale for one of several parameters, an indicator (arrow) sequentially positioned along the scale at a position corresponding to the value of the parameter displayed on the scale, and if desired, the correct time. The images of the scales and the position of the arrow are sequentially and synchronously varied to alternately provide the viewer with accurate information concerning a plurality of different parameters of interest along with a running indication of the correct time. The display of the device uses only a single meter and requires only a single moving element other than those employed in the clock projector, to wit, the moving coil of the galvanometer. As a result, the display device of the invention can be contained in a more compact housing, and in addition is more reliable and less costly than the heretofore known multi-image display devices.

In the embodiment of the invention specifically described hereinabove, provision is made for the periodic display of a printed message in place of the meteorological scales to provide the viewer with either commercial notices or items of general information and interest. Alternatively, a slide projector may be incorporated into the display for periodically interposing messages or pictorial representations into the display sequence instead of or in addition to the message inserted into the message illumination stage.

Thus, while only a single embodiment of the invention has been herein specifically described, it will be apparent that variations may be made therein all without departing from the spirit and scope of the invention.

We claim:

1. A multi-image display comprising a plurality of calibrated, stationary scales, means for alternately and sequentially optically projecting the images of said stationary scales onto an image plane, means for optically projecting an image of an indicator and for superimposing said image of said indicator with that of said scale at said image plane, means responsive to an input signal for positioning said image of said indicator at said image plane relative to the projected image of said scale thereat at a position corresponding to the magnitude of said input signal in which said positioning means comprises a meter receiving said input signal and having a member movable to an extent determined by the magnitude of said input signal, and a reflector coupled to said movable member and in optical communication with said indicator image projecting means.

2. The display of claim 1, further comprising means for projecting a time indication onto said image plane superimposed with said images of said indicator and of one of said scales.

3. The display of claim 1, further comprising means for sequentially and alternately applying one of a plurality of input signals to said meter in synchronism with the sequential operation of said scale image projecting means.

4. The display of claim 3, in which said indicator projecting means further comprises a second reflector in optical communication with said first reflector and with said image plane.

5. The display of claim 1, further comprising means for periodically inhibiting said first and second image projecting means, and third means for projecting an image of a message onto said image plane when said first and second image projecting means are inhibited.

6. The display of claim 5, in which said third projecting means includes an additional enclosure, additional illuminating means contained in said additional enclosure, means for positioning a message in said additional illuminating enclosure, and means for actuating said additional illuminating means when the other of said illuminating means are not actuated.

7. The display of claim 1, further comprising a television camera having a viewing plane located substantially at said image plane for transmitting said superimposed scale and indicator images to a remote television receiver.

8. The display of claim 7, in which said positioning means comprises a meter receiving said input signal and having a member movable to an extent determined by the magnitude of said input signal, and a reflector coupled to said movable member and in optical communication with said indicator image projecting means.

9. The display of claim 7, in which said scale projecting means comprises a plurality of enclosures each having a light transmissive panel on which one of said scales is opaquely formed, illuminating means in each of said enclosures, and means for sequentially and alternately actuating said illuminating means in said enclosures to thereby sequentially illuminate said panels.

10. The display of claim 1, further comprising a plurality of means for respectively sensing a different external parameter and for producing an output signal corresponding to said parameters, and means for sequentially coupling one of said output signals to said image positioning means.

11. The display of claim 10, further comprising weighting circuits interposed between said sensors and said meter for achieving uniform movement of said indicator image for each of said sensor output signals applied to said meter.

12. The display of claim 11, in which said scales are calibrated in units corresponding to the parameters respectively monitored by said plurality of sensors.

13. A multiimage display comprising a plurality of calibrated scales, means for alternately and sequentially projecting the images of said scales onto an image plane, means for projecting an image of an indicator and for superimposing said image of said indicator with that of said scale at said image plane, means responsive to an input signal for positioning said image of said indicator at said image plane relative to the projected image of said scale thereat at a position corresponding to the magnitude of said input signal, in which said positioning means comprises a meter receiving said input signal and having a member movable to an extent determined by the magnitude of said input signal, a reflector coupled to said movable member and in optical communication with said indicator image projecting means, and means for sequentially and alternately applying one of a plurality of input signals to said meter in synchronism with the sequential operation of said scale image projecting means, in which said indicator projecting means further comprises a second reflector in optical communication with said first reflector and with said image plane, and in which said first reflector is rotatable along with said movable member, and said second reflector comprises a parabolic reflector for converting the rotational movement of said first reflector to a corresponding lateral movement of said indicator image relative to said image of said scale at said image plane.

14. The display of claim 13, in which said scale projecting means comprises a plurality of enclosures each having a light transmissive panel on which one of said scales is opaquely formed, illuminating means in each of said enclosures, and means for sequentially and alternately actuating said illuminating means in said enclosures to thereby sequentially illuminate said panels.

15. The display of claim 14, further comprising image directing means interposed intermediate said panels and said image plane for directing the images of the illuminated one of said scales onto said image plane.

16. The display of claim 15, in which said directing means comprises at least one beam-splitting mirror having a reflecting surface in optical communication with one of said panels and with said first reflector, and a light-transmissive surface in optical communication with another of said panels.

17. A multi-image display comprising a plurality of calibrated scales, means for alternately and sequentially projecting the images of said scales onto an image plane, means for optically projecting an image of an indicator and for superimposing said image of said indicator with that of said scale at said image plane, means responsive to an input signal for positioning said image of said indicator at said image plane relative to the projected image of said scale thereat at a position corresponding to the magnitude of said input signal, means for projecting a time indication onto said image plane superimposed with said images of said indicator and of one of said scales, in which said time indication projecting means comprises an endless film having a plurality of viewing areas on which successively increasing time indicia are respectively formed, a projection station, and means for incrementally moving said film to position succeeding ones of said time indicia containing areas past said projection station.

* * * * *